United States Patent [19]

Swift

[11] 4,398,799
[45] Aug. 16, 1983

[54] HEAD-UP DISPLAYS

[75] Inventor: David W. Swift, Prestatyn, Wales

[73] Assignee: Pilkington P.E. Limited, St. Helens, United Kingdom

[21] Appl. No.: 237,694

[22] Filed: Feb. 24, 1981

[30] Foreign Application Priority Data

Mar. 4, 1980 [GB] United Kingdom ................. 8007204

[51] Int. Cl.³ .................... G02B 27/14; G02B 7/18; G09B 9/08
[52] U.S. Cl. .................... 350/174; 350/298; 358/93; 358/109; 358/250; 434/43; 352/132; 352/243
[58] Field of Search ............... 350/174, 171, 172, 169, 350/298; 434/43, 44, 38; 358/93, 109, 250, 104; 352/243, 95, 131, 132

[56] References Cited

U.S. PATENT DOCUMENTS

| 2,950,340 | 8/1960 | Compton et al. | 358/93 |
| 3,614,314 | 10/1971 | Rossive | 350/174 |
| 3,737,212 | 6/1973 | Antonson et al. | 350/174 |
| 3,885,095 | 5/1975 | Wolfson et al. | 350/174 |
| 4,040,744 | 8/1977 | Schertz et al. | 350/298 |
| 4,051,534 | 9/1977 | Dukich et al. | 358/93 |

OTHER PUBLICATIONS

Pratt, Patrick D., SID International Symposium of 1973, Digest of Tech. Papers (May 1973), pp. 136-137.

Primary Examiner—Jon W. Henry
Attorney, Agent, or Firm—F. Eugene Davis, IV

[57] ABSTRACT

In a head-up display system by which visual information from a display is superimposed by means of a combiner on a pilot's view of the outside scene, the pilot's view is recorded by a head mounted camera to which light from the outside scene and superimposed display is reflected by a head-mounted mirror. The arrangement is particularly useful for pilot training purposes.

10 Claims, 5 Drawing Figures

HEAD-UP DISPLAYS

BACKGROUND OF THE INVENTION

This invention concerns improvements in or relating to head-up displays.

A head-up display system presents to an observer, usually the pilot of an aircraft, a view of displayed visual information which is superimposed on the observer's view of the outside scene. The super-imposition can be achieved by means of a partially transparent reflector, often referred to as a combiner, through which the outside scene is viewed and which reflects light from a display source towards the observer's eyes. There have also been proposals for using diffractive optics combiners, and in particular holographic combiners, through which the observer views the outside scene and which deviate light from the display source either in a reflective mode or in a transmissive mode towards the observer's eyes. Such diffractive optics combiners generally have a real or an effective exit pupil within whose limits the observer's eyes must view in order to see the displayed visual information.

In some circumstances, and particularly for training purposes, there is a requirement for a record and/or a transmission of the view of the outside scene and the superimposed displayed visual information. In particular, there is a requirement for being able to evaluate, analyse and if necessary criticise a trainee pilot's actions and reactions relative to such view. Such record and/or transmission can be provided by means of a camera, which may be a film or cine camera or a television camera, but there are various problems associated with the provision of a satisfactory camera arrangement. These problems include the need to avoid interference with or obstruction of the pilot's view through the head-up display, or undue complication of the head-up display system. Also in an aircraft cockpit there are usually severe space limitations which make it difficult to find a suitable and safe location for the camera arrangement.

Some of these problems are outlined in U.S. Pat. No. 4,001,499 which suggests the use of a television camera mounted outside the pilot's cockpit on the nose, fuselage or a wing of the aircraft, or conceivably mounted within the cockpit but not viewing through the combiner, and an arrangement for combining video signals of the outside scene viewed by the camera with video signals derived from the display. A problem with this, and other arrangements involving a separate system from the head-up display system through which the pilot views, is that the outputs of the two systems may not always correspond. In particular there may sometimes be relative misalignment between the systems, or there may be failure or malfunction of a part in one system whose effect is not apparent in the other. This can therefore affect the validity of analysis in that it is not certain that the record or transmission on which the analysis is based in fact corresponds to the pilot's actual view (and a trainee pilot can contend that criticism of his actions or reactions is unjustified because it is based on something different from what he actually saw).

SUMMARY

According to the present invention there is provided apparatus for use with a head-up display system by which displayed visual information is superimposed on an observer's view of an outside scene, the apparatus comprising a camera and means for mounting the camera on the head of the observer so that the camera views the outside scene and the superimposed displayed information from substantially the same viewing position as the observer.

The invention further provides head-up display apparatus comprising a display source, superimposing means for superimposing an image of visual information displayed by the display source of an observer's view of an outside scene, a camera, and means for mounting the camera on the head of the observer so that the camera views the outside scene and the superimposed image of the displayed visual information from substantially the same viewing position as the observer.

Preferably the camera views effectively from a position between the observer's two eyes. Thus the apparatus may comprise light directing means and means for mounting the light directing means on the head of the observer at a position between the eyes so that the light directing means directs light to the camera mounted on the head of the observer. Specifically, the light directing means may comprise a mirror which reflects light to the camera. The mirror may be highly reflecting and small and located close to the bridge of the observer's nose so that it does not obscure the view from the observer's eyes. Alternatively the mirror may be larger and mounted further away from the observer's face and partially reflecting so that the observer's eyes can view through the mirror by receiving light transmitted through the mirror. The light directing means may comprise a hologram. The camera may be carried on a helmet which the observer wears and the light directing means may also be carried on such helmet.

Usually the outside scene viewed by the observer is distant and the displayed visual information is superimposed as an infinity image. In this case the camera is focussed at or near infinity.

The superimposing means may comprise diffractive optics, e.g. may be holographic, and provide a real or an effective exit pupil within whose limits and usually at or near which the observer's eyes view. The camera also views within the limits of the exit pupil, for example by appropriate location of the camera objective lens and said light directing means.

The camera may be of any of various types including in particular a film or cine camera which records images on photographic film, or an electronic camera whose output is recorded on magnetic tape or is transmitted to a remote location (e.g. from aircraft to ground) for analysis and/or recording.

BRIEF DESCRIPTION OF THE DRAWINGS

Apparatus in accordance with the invention will now be described, by way of example, with reference to the accompanying drawings, in which.

DESCRIPTION OF THE PREFERRED EMBODIMENTS

Figure 1:
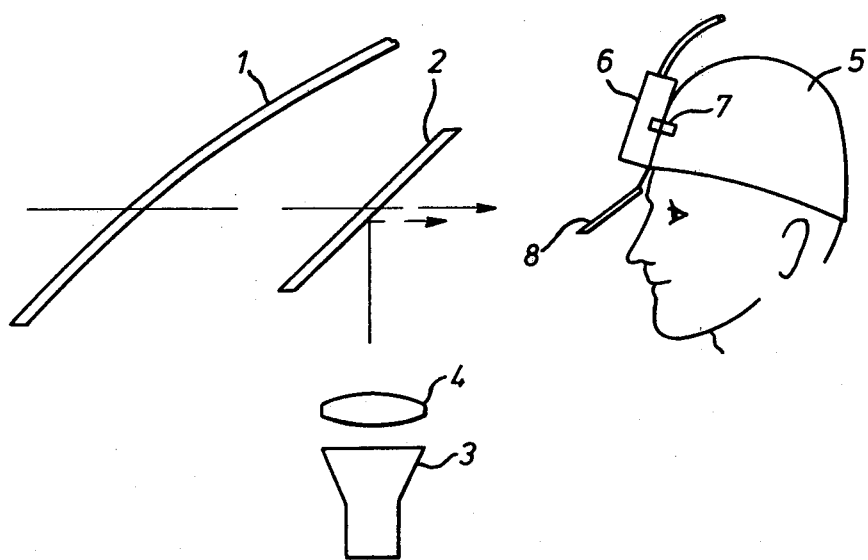
FIG. 1 is a schematic representation of a head-up display system.

FIG. 1 schematically shows an observer, and specifically the pilot of an aircraft, who views the outside scene through the cockpit windshield 1. Located between the windshield and the pilot's head is a superimposing means or combiner 2 which superimposes on the pilot's view of the outside scene an image of visual information displayed on a display source usually in the form of a cathode ray tube 3. The combiner 2 is partially reflective so that light from the cathode ray tube 3 is reflected from the combiner 2 towards the pilot's eyes while the pilot views the outside scene through, i.e. by way of light transmitted through, the combiner. The outside scene is usually distant so that the light therefrom is substantially collimated and optics, schematically represented by a lens 4, are provided to collimate light from the cathode ray tube so as to provide an infinity image of the displayed visual information. The pilot can then see the outside scene and the displayed visual information simultaneously with his eyes at the same focus.

The combiner 2 may comprise diffractive optics, and in particular may comprise one or more holograms, by which light is directed from the combiner to the pilot's eyes. Such arrangement may provide a real or an effective exit pupil within whose limits the pilot's eyes view usually at or near the exit pupil. It will be appreciated that use of diffractive optics for the combiner can make the collimating lens 4 unnecessary since collimation of light from the display source may be effected by the diffractive optics of the combiner itself. It will further be appreciated that while FIG. 1 shows by way of illustration a combiner which operates in a reflective mode, i.e. reflects light from the cathode ray tube towards the pilot's eyes, which can be achieved by use of one or more reflection holograms, the combiner could alternatively be arranged to operate in a transmissive mode, i.e. to deviate light from the cathode ray tube towards the pilot's eyes by transmission through the combiner employing one or more transmission holograms, the positions and orientations of the parts being arranged accordingly.

The pilot wears a helmet 5 on which, in accordance with the invention, is mounted a camera 6 so that the camera views the outside scene and the superimposed image of the displayed information from substantially the same viewing position as the pilot. The camera 6 is mounted by holding elements 7 centrally at the front of the helmet 5 and a light directing means in the form of a mirror 8 is also mounted on the front of the helmet so as to depend downwardly from the helmet rim and to reflect light into the camera. Thus light travelling towards the pilot's head between the two eyes is reflected by the mirror up to the camera which therefore views effectively from a position between the pilot's two eyes.

Figure 2:
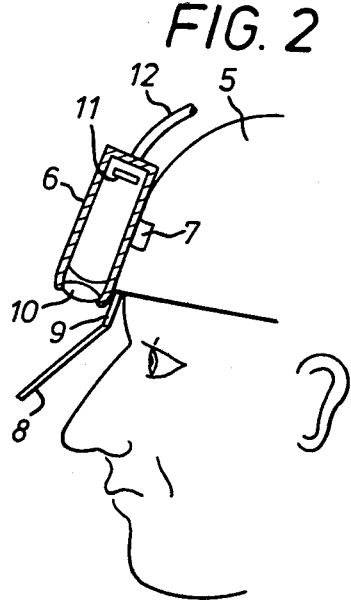
FIG. 2 is a schematic side view of one embodiment of head mounted apparatus.
Figure 3:
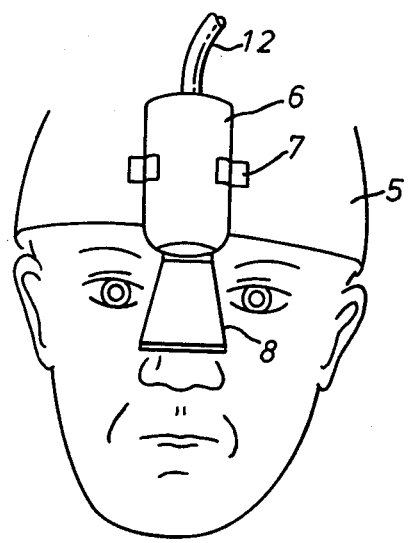
FIG. 3 is a schematic front view of the embodiment of FIG. 2.

One arrangement is shown more fully in FIGS. 2 and 3. A small mirror 8 is supported by a strap 9 depending downwardly from the helmet rim centrally at the front. The mirror 8 is thus located close to the bridge of the pilot's nose and between his two eyes. The small size of the mirror and its proximity to the pilot's nose enables the pilot's eyes to see past the mirror on each side without it obscuring his view. The mirror is highly reflective and angled to reflect light coming from the combiner into the camera 6.

The camera shown in FIGS. 2 and 3 is a solid state electronic camera having an objective lens 10 which focusses the received light on to a sensor array 11. The camera is usually focussed at or near infinity, i.e. so that collimated light received by the objective lens 10 is focussed on to the sensor array 11, consistent with a distant outside scene and an infinity image of the displayed visual information as previously mentioned. Behind the sensor array are pre-amplifiers and other electronics of known form and the camera output is transmitted by an electrical connection in the form of a cable 12 to further signal processing and/or recording equipment. Such further equipment is located away from the helmet elsewhere in the cockpit and the cable 12 simply plugs into it in suitable manner. The equipment may comprise means for recording the output from the camera on magnetic tape for subsequent replay and analysis, and/or a transmitter to transmit the camera output from the aircraft directly to ground for recording and/or analysis at a ground receiver. As a further possibility, in a training aircraft the camera output could be passed to an instructor's cockpit or location for viewing by the instructor on a screen.

The camera could alternatively be a film or cine camera having a reel of photographic film which can subsequently be developed. However, an electronic camera is preferable being smaller and lighter in weight, permitting signal processing, and generally being more compatible with modern technology.

Figure 4:
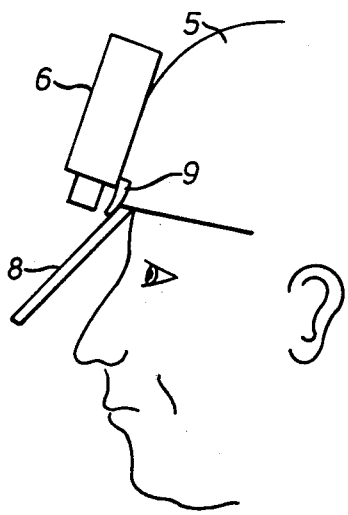
FIG. 4 is a schematic side view of another embodiment of head mounted apparatus.
Figure 5:
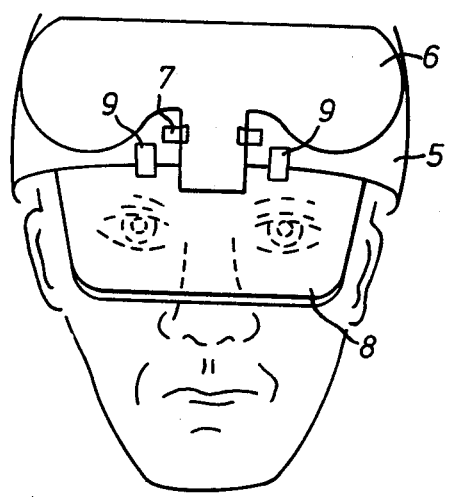
FIG. 5 is a schematic front view of the embodiment of FIG. 4.

FIGS. 4 and 5 show another arrangement employing a larger mirror 8 than that of FIGS. 2 and 3. In the FIGS. 4 and 5 embodiment the mirror 8 is like a visor suspended by straps 9 or other suitable fitting from the helmet rim at the front. The mirror 8 is partially reflective and has a flat surface at its central portion suitably angled to reflect light coming from the combiner into the camera 6, but is also partially transmissive so that the pilot can see through it, i.e. can view the outside scene and the superimposed displayed visual information by way of light from the combiner transmitted through the mirror 8 to his two eyes. The mirror 8 may have nonuniform reflectance with maximum reflectance at the centre, i.e. at the position between the pilot's eyes from which light is reflected into the camera, reducing preferably to zero at the positions in front of the eyes. It will be seen that the visor type arrangement of FIGS. 4 and 5 does not require the mirror 8 to be located as close to the pilot's face as the small mirror arrangement of FIGS. 2 and 3. It may therefore have some comfort advantage, but it requires a partially reflective mirror as against the highly and possibly totally reflective mirror of the FIGS. 2 and 3 embodiment.

For purposes of illustration FIGS. 4 and 5 show a film or cine camera 6. It will be understood, however, that an electronic camera could be, and as explained above is preferably, employed.

When the combiner 2 comprises diffractive optics and provides a real or an effective exit pupil, the mirror 8 is located slightly in front of the exit pupil and reflects light to the camera objective lens 10 which is located at or near and within the limits of the exit pupil for the reflected light.

It will be appreciated that the camera view effectively from a position between the pilot's eyes is in the brightest part of the display so that the camera lens need not be of very high aperture, and can therefore be physically small. Thus, the camera device mounted on the pilot's helmet can be simple and small and the extra weight on the pilot's head need not present any serious problem particularly for training purposes. It will be understood that the device could, but need not be, permanently mounted on the helmet. Thus a detachable mounting arrangement could be employed. It will further be understood that mounting the device on the helmet is a particularly convenient way of achieving head mounting, a helmet being normal wear for a pilot under training or other flying or simulated flying conditions. However, other forms of head-mounting could be employed; for example the device, or at least the mirror 8, could be worn in a manner similar to spectacles or goggles.

In the embodiment of FIGS. 4 and 5, the mirror 8 is described above as partially reflective possibly with maximum reflectance at the centre. It will be understood that it could comprise a holographic reflector at its centre. Thus the visor-like element through which the pilot views could have a reflection hologram over its central area, i.e. the area between the pilot's eye positions, such hologram being constructed by means of a first light beam emanating from a first point effectively at the camera aperture position and a second light beam emanating from a second point which is at the mirror-image position of the first point (with respect to the required hologram). In practice the construction of the hologram can conveniently be effected by means of a point light source at the first point and by use of a backing mirror which by reflection of the light effectively provides the second light beam from the second point. Such holographic reflector arrangement can enable the pilot better to see through the central part of the visor since, when his eyes are directed so as to receive light passing through that central part, such light will be incident at angles different from those at which the reflective hologram operates and will therefore be transmitted through the visor unaffected by the hologram.

If desired, the small mirror 8 in the embodiment of FIGS. 2 and 3 could also be a holographic reflector having a suitable reflection hologram.

It will be appreciated that providing a camera view from substantially the same position as the pilot's view, and specifically from a position between the pilot's eyes, makes it reasonably certain that the camera output corresponds essentially to the pilot's actual view (and makes it very difficult for a trainee pilot reasonably to contend otherwise).

I claim:

1. Apparatus for use with a head-up display system by which displayed visual information is superimposed on an observer's view of an outside scene, the apparatus comprising a camera, means for mounting the camera on the head of the observer, light directing means having a reflective area, and means for mounting the light directing means on the head of the observer with said reflective area between the eyes of the observer so as to reflect light to the camera which thereby views both the outside scene and the superimposed displayed information from substantially the same viewing position as the observer.

2. Head-up display apparatus comprising a display source, superimposing means for superimposing an image of visual information displayed by the display source on an observer's view of an outside scene, a camera, means for mounting the camera on the head of the observer, light directing means, and means for mounting the light directing means on the head of the observer at a position between the observer's two eyes to receive light from the superimposing means and direct it to the camera so that the camera views both the outside scene and the superimposed image of the displayed visual information from substantially the same viewing position as the observer.

3. Apparatus according to claim 2 in which the light directing means comprises a mirror which reflects light to the camera.

4. Apparatus according to claim 3 in which the mirror is highly reflecting and small and mounted such that it is close to the bridge of the observer's nose so that the observer's eyes can look past the mirror on each side.

5. Apparatus according to claim 3 in which the mirror is partially reflecting so that the observer's eyes can view through the mirror by receiving light transmitted through the mirror.

6. Apparatus according to claim 2 in which the light directing means comprises a hologram.

7. Apparatus according to claim 1 or claim 2 in which the camera is carried on a helmet.

8. Apparatus according to claim 1 or claim 2 in which the light directing means is carried on a helmet.

9. Apparatus according to claim 1 or claim 2 in which the camera is focussed at or near infinity.

10. Apparatus according to claim 2, in which the superimposing means comprises diffractive optics which provide a real or effective exit pupil within whose limits the observer's eyes view, the apparatus being such that the camera also views within the limits of the exit pupil.

* * * * *